United States Patent
Gaver et al.

(10) Patent No.: US 11,678,135 B2
(45) Date of Patent: *Jun. 13, 2023

(54) METHODS CIRCUITS SYSTEMS AND ASSOCIATED COMPUTER EXECUTABLE CODE FOR LOCALIZING AND MESSAGING A WIRELESS COMMUNICATION DEVICE

(71) Applicant: WIX.COM LTD, Tel Aviv (IL)

(72) Inventors: Ido Gaver, Givatayim (IL); Eran Kirshenboim, Tel Aviv (IL)

(73) Assignee: WIX.COM LTD, Tel-Aviv (IL)

( * ) Notice: Subject to any disclaimer, the term of this patent is extended or adjusted under 35 U.S.C. 154(b) by 197 days.

This patent is subject to a terminal disclaimer.

(21) Appl. No.: 17/302,951

(22) Filed: May 17, 2021

(65) Prior Publication Data

US 2022/0014871 A1    Jan. 13, 2022

Related U.S. Application Data

(63) Continuation of application No. 17/073,459, filed on Oct. 19, 2020, now Pat. No. 11,039,272, which is a
(Continued)

(51) Int. Cl.
*H04W 4/021* (2018.01)
*H04W 4/02* (2018.01)
(Continued)

(52) U.S. Cl.
CPC ........ *H04W 4/021* (2013.01); *G06Q 30/0281* (2013.01); *H04L 67/55* (2022.05); *H04W 4/023* (2013.01); *H04W 8/005* (2013.01); *H04W 24/00* (2013.01); *H04W 4/80* (2018.02); *H04W 64/003* (2013.01)

(58) Field of Classification Search
CPC ..... H04W 4/021; H04W 8/005; H04W 24/00; H04W 4/023; H04W 64/003; H04W 4/80; H04W 4/02; H04W 4/024; H04W 4/029; H04W 64/00; H04L 67/26; H04L 29/08108; H04L 29/08657; H04L 29/08936; G06Q 30/0281
See application file for complete search history.

(56) References Cited

U.S. PATENT DOCUMENTS

| | | | |
|---|---|---|---|
| 8,929,920 B2 * | 1/2015 | Khorashadi | H04W 4/50 455/457 |
| 9,420,430 B2 * | 8/2016 | Wuoti | G06Q 30/0207 |
| 2015/0080032 A1 * | 3/2015 | Moldavsky | H04W 4/02 455/456.3 |

OTHER PUBLICATIONS

Shortencarier, Michaelann J., et al. "A method for radiation-force localized drug delivery using gas-filled lipospheres." IEEE transactions on ultrasonics, ferroelectrics, and frequency control 51.7 (2004): 822-831. (Year: 2004).*

* cited by examiner

*Primary Examiner* — Sharad Rampuria
(74) *Attorney, Agent, or Firm* — Vladimir Sherman; Reinhold Cohn Group

(57) ABSTRACT

Disclosed are methods, circuits, systems and associated computer executable code for detecting the presence of a mobile computing device in a specific area. Included are means for receiving a message from the mobile device including a coarse location indicator, determining that the received coarse location indicator is in proximity with one or more local (e.g. retailer) stations, and causing at least one of the one or more local stations to transmit a mobile device specific poling signal to the device.

12 Claims, 8 Drawing Sheets

Related U.S. Application Data continuation of application No. 16/143,709, filed on Sep. 27, 2018, now Pat. No. 10,863,303, which is a continuation of application No. 15/375,091, filed on Dec. 11, 2016, now Pat. No. 10,117,049, which is a continuation of application No. 14/836,990, filed on Aug. 27, 2015, now Pat. No. 9,521,516, which is a continuation of application No. 13/613,083, filed on Sep. 13, 2012, now Pat. No. 9,137,679.

(60) Provisional application No. 61/535,999, filed on Sep. 18, 2011.

(51) Int. Cl.
*H04L 67/55* (2022.01)
*H04W 24/00* (2009.01)
*G06Q 30/02* (2023.01)
*H04W 8/00* (2009.01)
*H04W 64/00* (2009.01)
*H04W 4/80* (2018.01)

METHODS CIRCUITS SYSTEMS AND ASSOCIATED COMPUTER EXECUTABLE CODE FOR LOCALIZING AND MESSAGING A WIRELESS COMMUNICATION DEVICE

FIELD OF THE INVENTION

The present invention relates to the fields of computing and communication. More specifically, the present invention relates to methods, circuits, systems and associated computer executable code for localizing and messaging a wireless communication device.

SUMMARY OF THE INVENTION

The present invention includes methods, circuits, apparatus, devices and systems for detecting the presence of a communication device. The present invention further includes methods, circuits, systems and associated computer executable code for localizing and messaging a wireless communication device. According to some embodiments, a mobile communication device may be localized (i.e. determined to be located) at or near a specification location (e.g. at or near a retailer) based on a multistage process.

According to some embodiments, the multistage process of localizing a communication device may include: (1) ID based coarse location estimation, and (2) selective local communication node scanning or poling (wherein the terms scanning and poling are interchangeable) for a transceiver of the communication device. More specifically, when a localization server according to some embodiments of the present invention receives an indication that a target device is located within coarse location, the localization server may check a database to determine whether any associated local communication nodes reside within the coarse location. The localization server may trigger some or all of the local communication nodes located within coarse location to scan for a transceiver of the target device.

According to further embodiments, one or more local communication nodes may be associated with a specification location. According to yet further embodiments, detection of a transceiver of a communication device by a local communication node associated with a specification location may trigger a message being sent to the communication device, either through the local communication node or through a Client Device Access Network (CDAN) comprised of Access points which can be cellular base stations, wifi routers/hotspots/basestations and more. The message may be a message selected by, or otherwise related to, the specification location—for example a promotional message, a greeting, a reminder of discount and more.

According to some embodiments, the communication device may include first and second transceivers, each with a unique identifier (e.g. MAC address) and each of a different type adapted to communicate according to different communication parameters (e.g. frequencies, encoding, modulation, protocols, etc.). The first transceiver may be adapted to communicate with a first type of wireless network (for example, Cellular, satellite, hot spots and more) which may be the CDAN and the second transceiver with a second type of wireless network (for example WiFi or Bluetooth). According to some embodiments of the present invention, detection of the communication device (i.e. the first transceiver) within a given coverage area of a wireless network of the first type may trigger one or more appliances (e.g. access points) associated with a second wireless network of the second type, located within the given coverage area, to scan for a transceiver with a MAC address associated with the second transceiver of the communication device.

According to some embodiments of the present invention, a communication device may download or install an application or a loyalty program module which may initiate or cause the communication device to enroll in the localization server. The enrollment of a communication device may include target device information such as: adding identifiers, parameters, characterizations and information associated with the device to the localization server and stored there such as: network identifier, MAC address(es) and more. The different parameters may be correlated to each other in the server.

According to some embodiments of the present invention, the communication device may sense a change in location and transmit location estimation information to the localization server. Optionally, location information may only be calculated and/or transmitted if the communication device detects a change in location which is above a predefined threshold. The location estimation information may be calculated and/or detected based on CDAN for example: cellular base-station ID, GPS information, cellular triangulation, Hotspots or other methods of detecting or tracking movement in a communication device.

According to some embodiments of the present invention, when the localization server receives location estimation information it may identify the device which transmitted the location estimation information and retrieve target device information such as the device MAC address. The localization server may also retrieve one or more specification location stations within a proximity to the coarse location. The localization server may relay target device information such as MAC address(es) to a specification location station which may include a local communication node. The specification location station may utilize the received target device information to scan or poll for a target device. Optionally, a detection of a transceiver of a target device by a local communication node may trigger a message being sent to the communication device, either through the local communication node or through the CDAN.

According to some embodiments of the present invention, the specification location station may poll the target device. The poling may be carried out, for example, continuously for a predetermined length of time, periodically or intermittently and may be terminated when an acknowledge is received from the target device or after a predetermined length of time.

According to some embodiments of the present invention, no-click check-in may be obtained or executed; a subscribed communication device may be detected in proximity to a specification location by being in a coarse location that the specification location resides in, while refraining from actively initiating polling for the communication device. In accordance with some embodiments of the invention, the no-click check-in may be obtained while the application may not be running or even open on the background.

According to some embodiments of the present invention, a push notification server may receive an acknowledgment that the target device has been polled as well as target device information and may subsequently relay a message to the target device via the local communication node or CDAN. The push notification server may store messages to be relayed to target devices. Optionally, more than one message may be stored in association with a specific specification location and additional parameters may designate which of the messages to send to the target device (for example, the time of day, date, additional target device information and more). In accordance with some embodiments the push notification server may be associated with or in proximity to the localization server, the specification location station or other.

According to some embodiments of the present invention, the communication device may send an acknowledgment when it receives a poling signal and/or when it receives a pushed message. The acknowledgment may be relayed through the specification location station or the CDAN to the push notification server, the localization server in order to: trigger the push notification message being sent, tracking of push message transactions, support tallying of target device visits to specification location, or other functional, system or commercial aspects of some embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
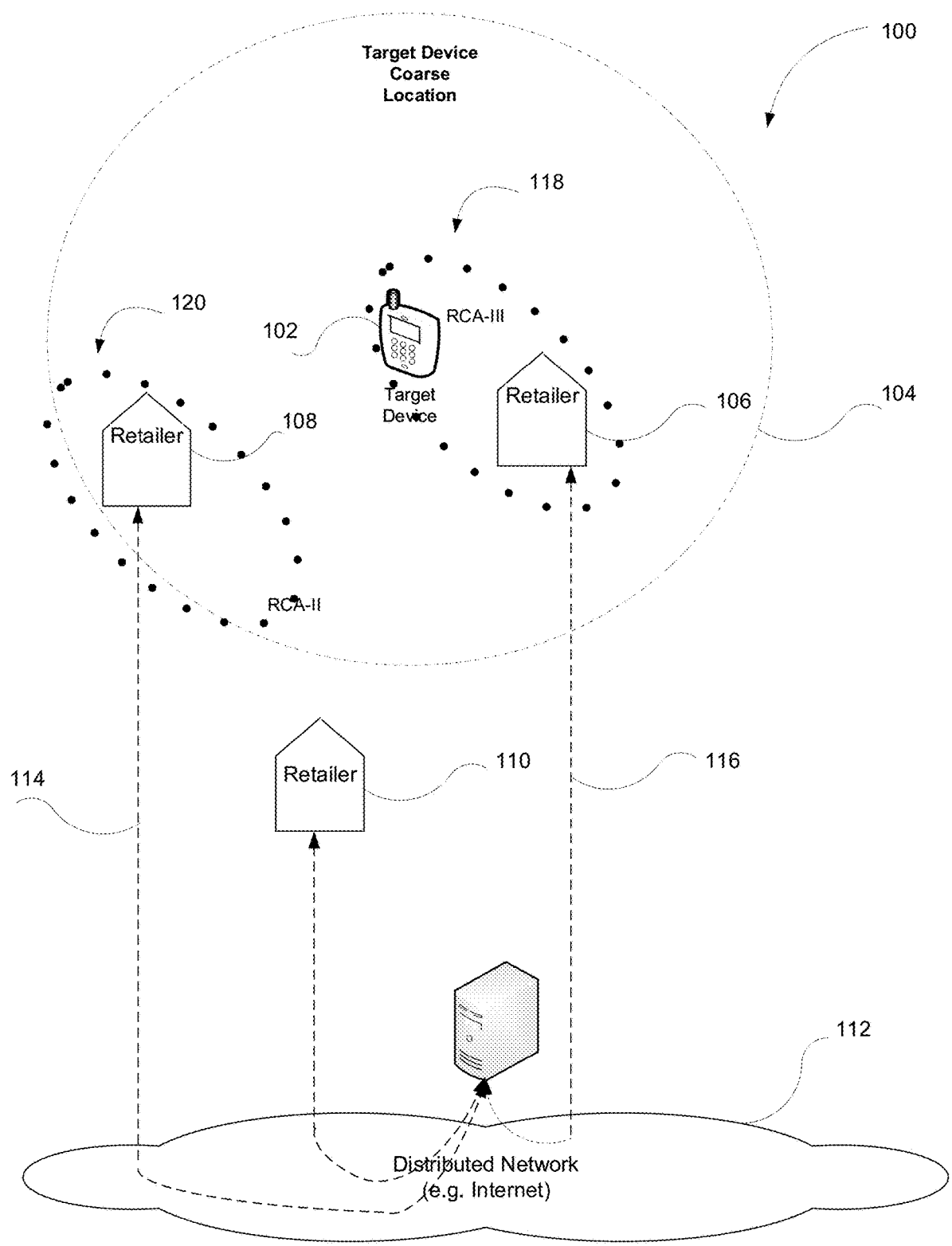
FIG. 1A is a diagram illustrating localization of a wireless device according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It is understood that a specification location may refer to a retailer, business, store, shopping mall, restaurant, entertainment center, movie theatre, cinema complex, airport, bus stop, train station, franchise or a group of franchises or any other place that may have interest or interest in sending messages associated with that place.

Now turning to FIG. 1A, there is shown a diagram (100) illustrating localization of a wireless device according to embodiments of the present invention. A wireless device, such as wireless communication device 102 may be associated with a crude location such as target device coarse location (TDCL) 104. A specification location within TDCL 104 such as Retailer 108 and Retailer 106 may receive a signal, via a network such as distributed network 112, to initiate poling for target device 102. Optionally, additional information such as an identifier of target device 102 may also be received retailers 108 and 106. Retailers 106 and 108 may scan for target device 102 within a coverage area such as retailer coverage areas (RCA) 118 and 120 (respectively). Retailer 106 may detect target device 102 within RCA 118. Thus, an exemplary mode of no-click check-in may be achieved wherein wireless communication device 102 was detected within RCA 118 without a dedicated application turned on or running in the background.

According to some embodiments, additional retailers such as retailer 110, which are outside, excluded, extraneous, extrinsic or foreign to Target Device Coarse location 104 may refrain from scanning for target device 102.

According to some embodiments, retailer 106 may detect target device 102 within RCA 118 and subsequently may relay information via the distributed network 112. Detection of target device 102 may cause retailer 108 to conclude poling for target device 102.

Figure 1B:
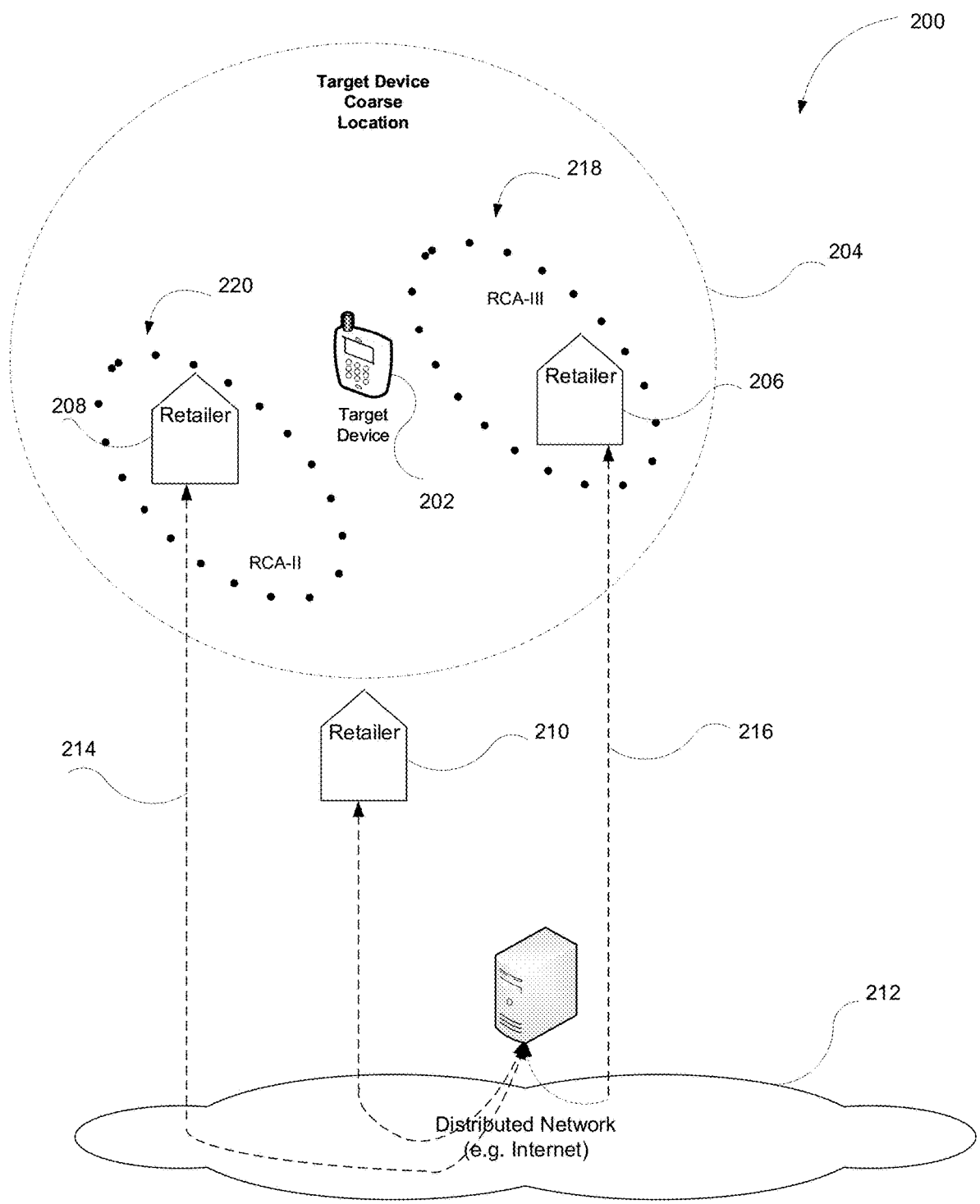
FIG. 1B there is a diagram illustrating localization of a wireless device according to embodiments of the present invention.

Turning now to FIG. 1B, target device there is shown a diagram (200) illustrating localization of a wireless device according to embodiments of the present invention. It is understood that elements 200-220 are substantially similar to elements 100-120 of FIG. 1A in accordance to some embodiments of the present invention. In this example, retailers 206 and 208 are within TDCL 204 and may poll for target device 202 within RCA 218 and 220 (accordingly). In this example target device 202 is not within RCA 218 or 220, thus retailers 206 and 208 may not detect target device 202.

According to some embodiments, retailers 206 and 208 may pole for target device 202 continuously, intermittently or may stop polling after a predetermined length of time, or when target device 202 is no longer detected within a TDCL in which they reside, or when receiving a signal via distributed network 212 to conclude poling.

Figure 1C:
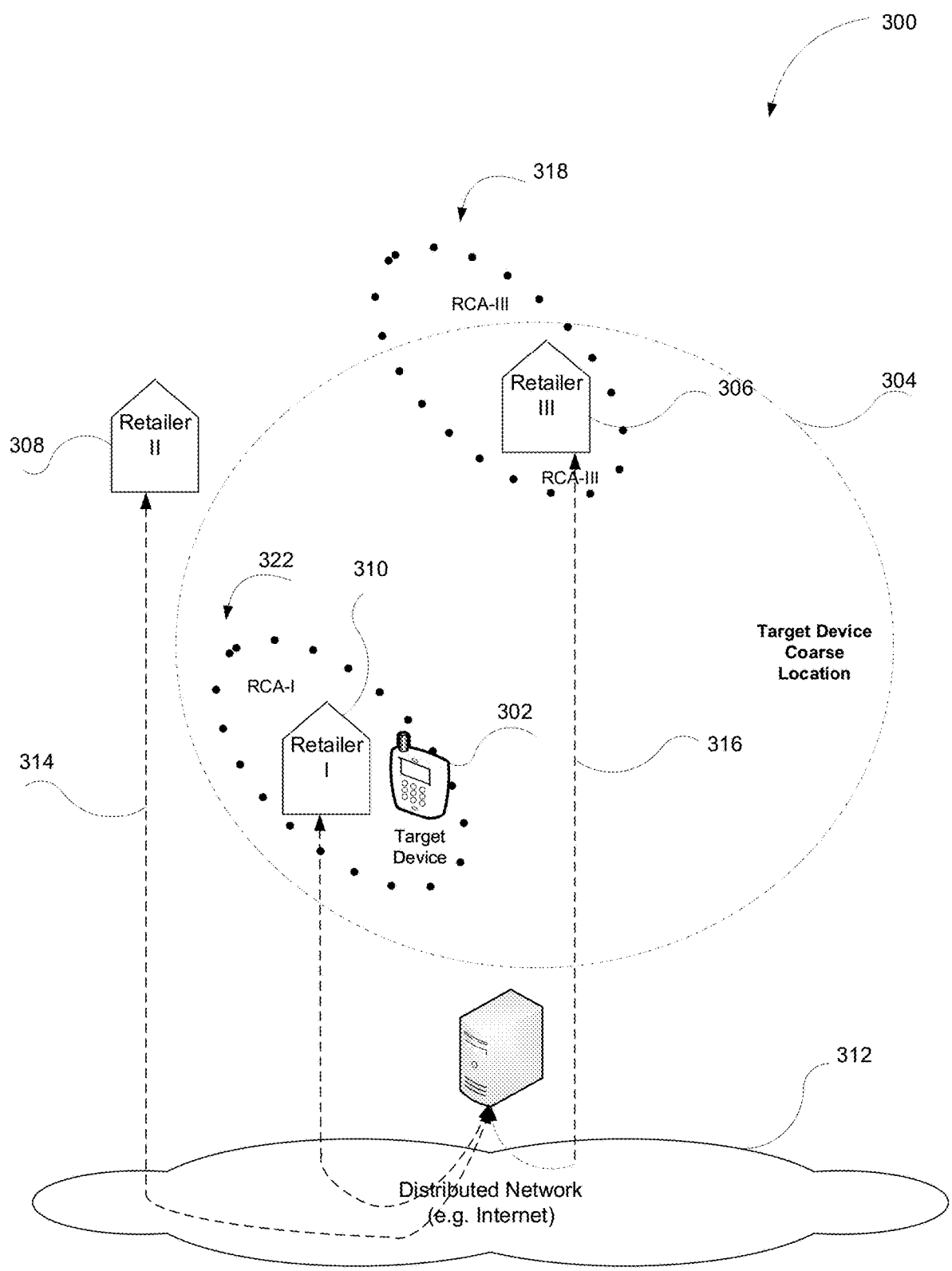
FIG. 1C is a diagram illustrating localization of a wireless device according to embodiments of the present invention.

Turning now to FIG. 1C, target device there is shown a diagram (300) illustrating localization of a wireless device according to embodiments of the present invention. It is understood that elements 300-320 are substantially similar to elements 100-120 of FIG. 1A in accordance to some embodiments of the present invention. In this example, target device 302 may be associated with a crude location such as target device coarse location (TDCL) 304. Retailers 310 and 306 may initiate poling for target device 302 and may scan for target device 302 within a coverage area such as retailer coverage areas (RCA) 322 and 318 (respectively). Additional retailers such as retailer 308, which are outside, excluded, extraneous, extrinsic or foreign to Target Device Coarse location 304 may refrain from scanning for target device 302.

Figure 2:
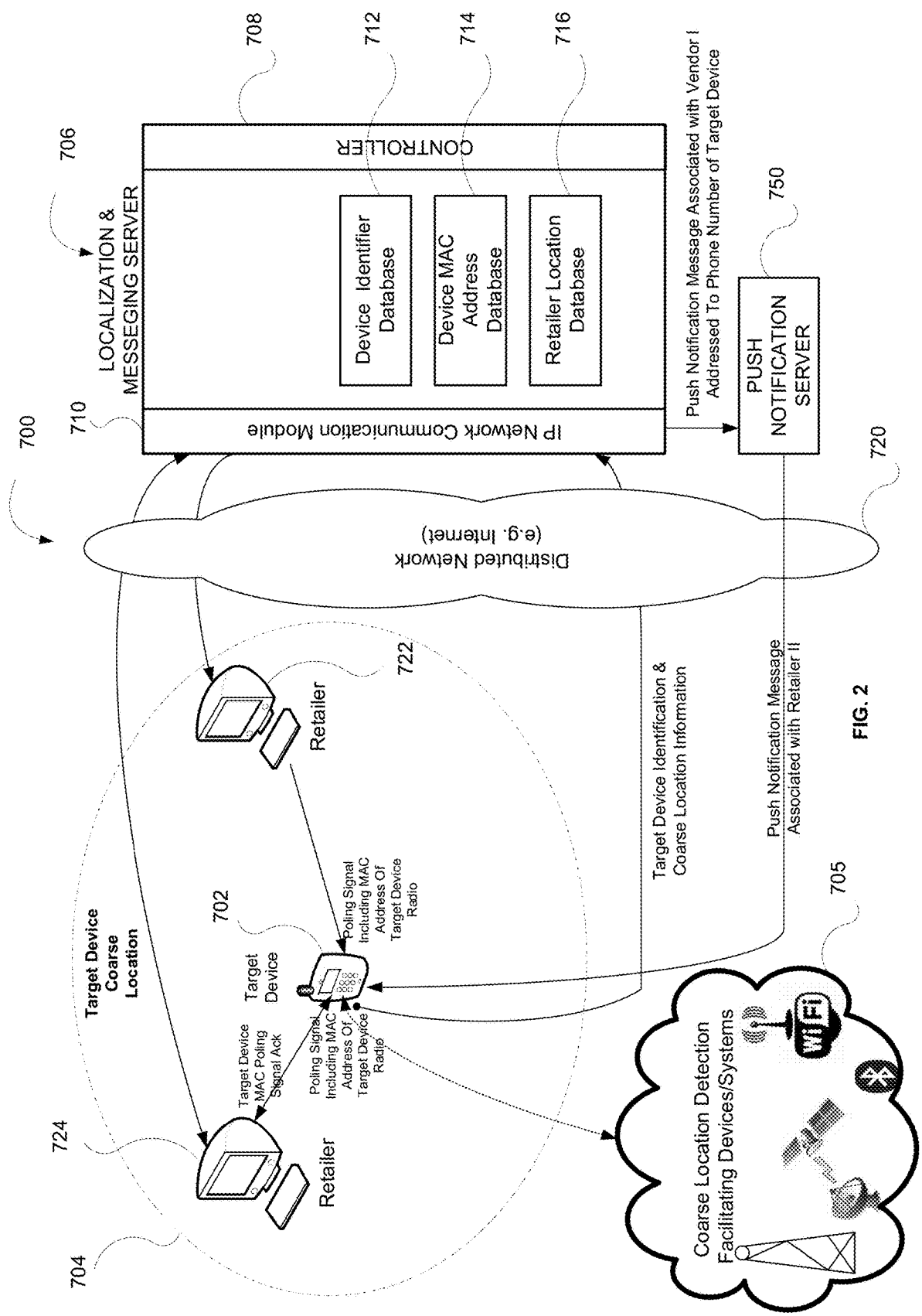
FIG. 2 is a diagram illustrating some of the functional elements of an exemplary system for localizing and messaging a wireless communication device in accordance with some embodiments of the present invention.

Turning now to FIG. 2 is shown a diagram (700) illustrating some of the functional elements of an exemplary system for localizing and messaging a wireless communication device in accordance with some embodiments of the present invention. A communication device such as target device 702 may be associated with a crude location such as TDCL 704. TDCL may be determined based on one or more known location estimation algorithms based on the specific solutions associated with target device 702. Accordingly, TDCL 704 may be based on Wifi Hotspots, Cellular based, GPS or other depicted by Coarse Location Detection Facilitating Devices/Systems 705 and may be calculated/derived/determined at the target device or relayed to the target device via a gateway or base station (not shown). TDCL 704 may be relayed to a localization server such as localization and messaging server (LMS) 706.

According to some embodiments of the present invention, LMS 706 may include a controller such as controller 708, a communication module such as IP network Communication Module (IPNCM) 710 for carrying out communication to and from LMS 706, and databases for storing information. Some of the databases may include: an identification database such as Device Identifier Database 712, for storing unique identifiers of communication devices associated with a first type of network, a secondary identification database such as Device MAC Address Database 714, for storing unique identifiers of communication devices associated a second or more type of networks, and a specification location database such as retailer location database 716, for storing geographical/location information of retailers.

According to some embodiments of the present invention, LMS 706 may receive information (which may include a unique identifier, TDCL and more) from target device 702 via a network such as distributed network 720. LMS 706 may compare the received unique identifier to Device identifier Database 712 to determine if target device 702 is stored/enrolled in LMS 706. Furthermore, Device MAC address database 714 may retrieve secondary addresses associated with the same target device. LMS may review/go over/scan retailer location database 716 to determine which (if any) of the stored/enrolled retailers are located within the TDCL 704.

In our example, in accordance with some embodiments of the invention, two specification location are depicted as residing within TDCL 704: retailer 724 and retailer 722. Accordingly, LMS 706 may relay triggers to the retailers 722 and 724 to scan or pole for target device 702. Retailer 722 may activate one or more poling signals associated with a specific secondary address, received from device MAC address database 714. Retailer 724 may substantially proceed as described above for retailer 722.

In our example, in accordance with some embodiments, Target device 702 may be detected by retailer 724 and may acknowledge detection. In response to receipt of acknowledgement or detection retailer 724 may signal to LMS 706 that target device 702 is within its retailer coverage area (as described in FIG. 1A-C).

In accordance with some embodiments of the present invention, LMS 706 may respond to a confirmation or notification of detection of target device 702 by notifying a push server, such as push notification server 750, that a detection has been made. LMS 706 may forward information such as target device unique address associated with a first network and additional unique address associated with secondary networks, RCA in which target device 702 was found, retailer that found target device 702 and more. Furthermore, information such as which message/content of the message to be sent, compiled statistics (for example: tally of visits to retailer 724), conditional logic and parameters for determining the content of the message may either be relayed to or stored on push notification server 750.

In accordance with some embodiments, push notification server 750 may relay the message to target device 702, this may be executed via the CDAN or anyone of the additional or secondary networks to access target device 702 including activating local nodes associated with retailer 724.

In accordance with some embodiments of the present invention, push notification server 750 may be functionally associated with LMS 706, or it may be integral or included in LMS 706. Notification server 750 may further be associated with a group of LMS servers and may also receive information and messages to push from systems other than localization and messaging servers.

In accordance with some embodiments, a push notification server may be associated with a specification location stations discussed in detail below.

Figure 3A:
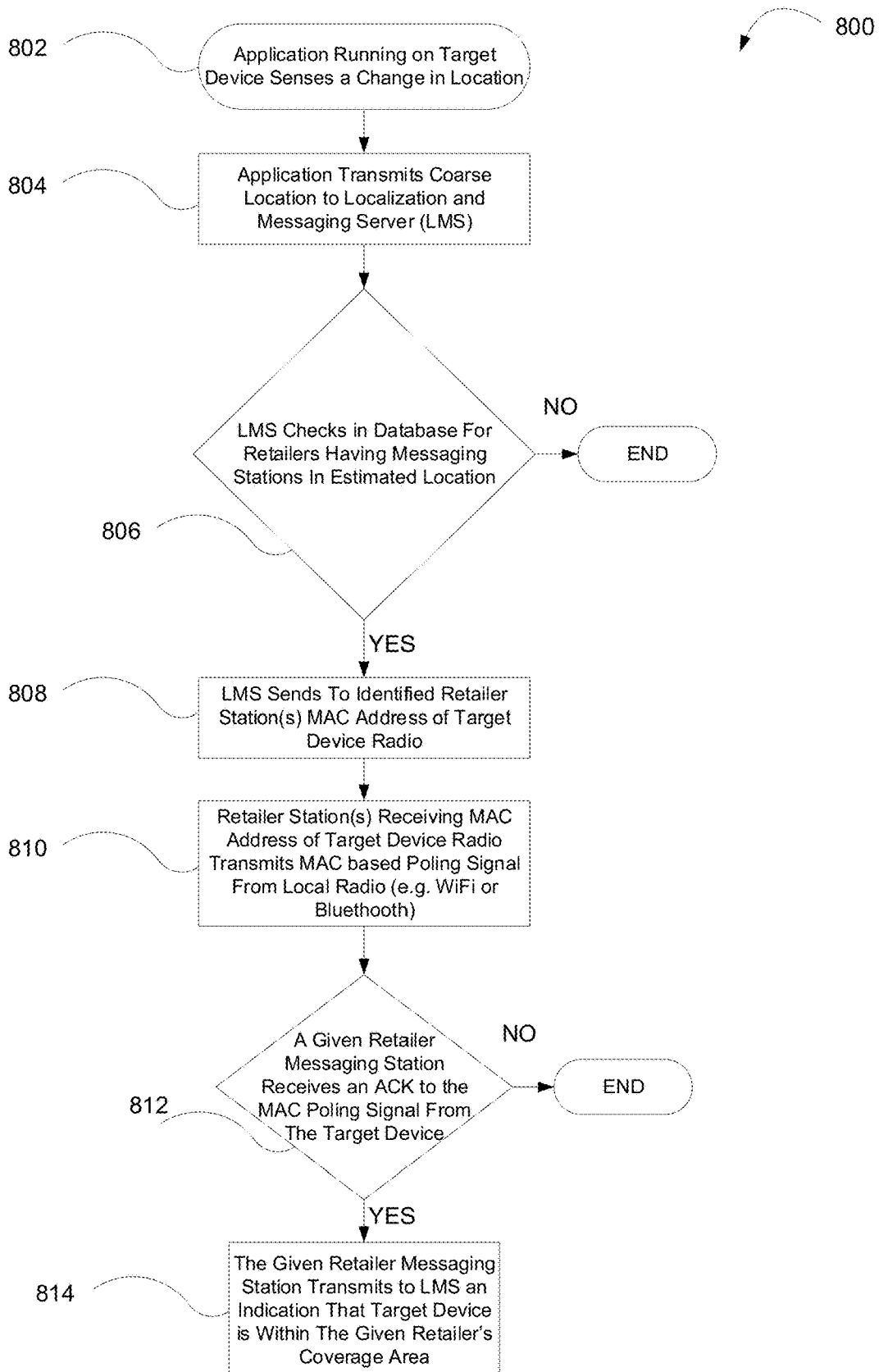
FIG. 3A is a flow chart including steps of various methods by which a system for localizing a wireless communication device in accordance with some embodiments of the present invention may function.

Turning now to FIG. 3A, a flow chart (800) including steps of various methods by which a system for localizing a wireless communication device in accordance with some embodiments of the present invention may function. An application running on a target device may sense a change in location (step 802). The application may then transmit coarse location to a LMS (step 804). The LMS may check for retailers having messaging stations (retailer stations)

within the coarse location (step 806). If the LMS detects such retailers within the coarse location, the LMS may send to the one or more identified/detected retailer stations a MAC address of the target device radio(s) (step 808). The retailer station may receive a MAC address of the target device radio and may transmit a MAC based poling signal from a local radio included or associated with the retailer station (step 810). It is understood with regard to step 808 and step 810, that the MAC address being sent may be several MAC addresses associated with the same target device (for example: Wifi address, Bluetooth address and more) and that the retailer may poll for the target device on several different local radios (for example, Bluetooth, Wifi or other). The retailer station may receive an acknowledgement from the target device if it is within the retailer's RCA (step 812). If a target device is detected within the RCA of a given retailer, the retailer may further transmit to the LMS an indication that the target device is within the given retailer's RCA (step 814).

Figure 3B:
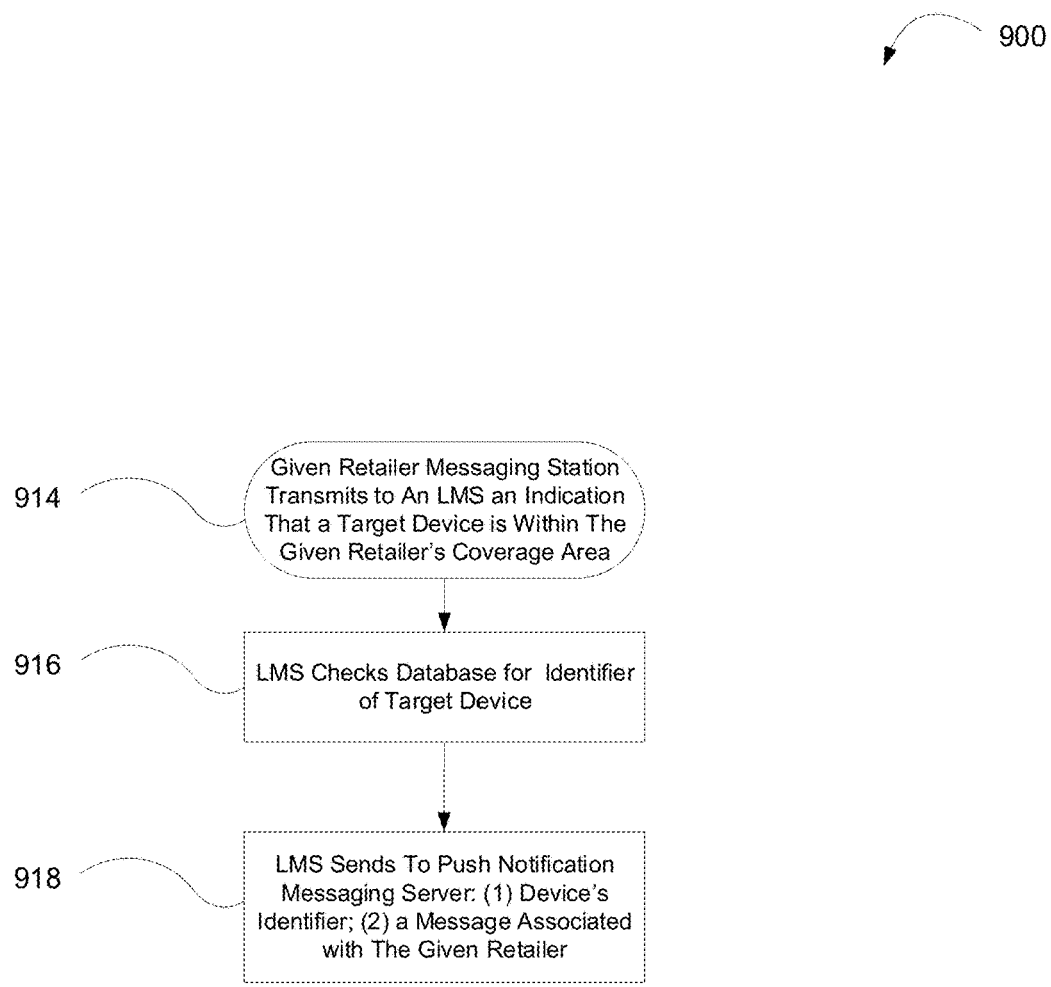
FIG. 3B is a flow chart including steps of various methods by which a system for messaging a wireless communication device in accordance with some embodiments of the present invention may function.

Turning now to FIG. 3B, a flow chart (900) including steps of various methods by which a system for messaging a wireless communication device in accordance with some embodiments of the present invention may function. It is understood that step 914 may be substantially the same as step 814 of FIG. 3A. and that the steps of flow chart 900 may follow some or all of the steps of flow chart 800. A LMS may check for a unique identifier of the target device (step 916), this may also include unique identifiers associated with secondary networks and the LMS may forward the unique identifiers associated with a first or secondary networks to a Push Notification Server, as well as a message associated with the retailer that the target device was found within its RCA (step 918).

Figure 3C:
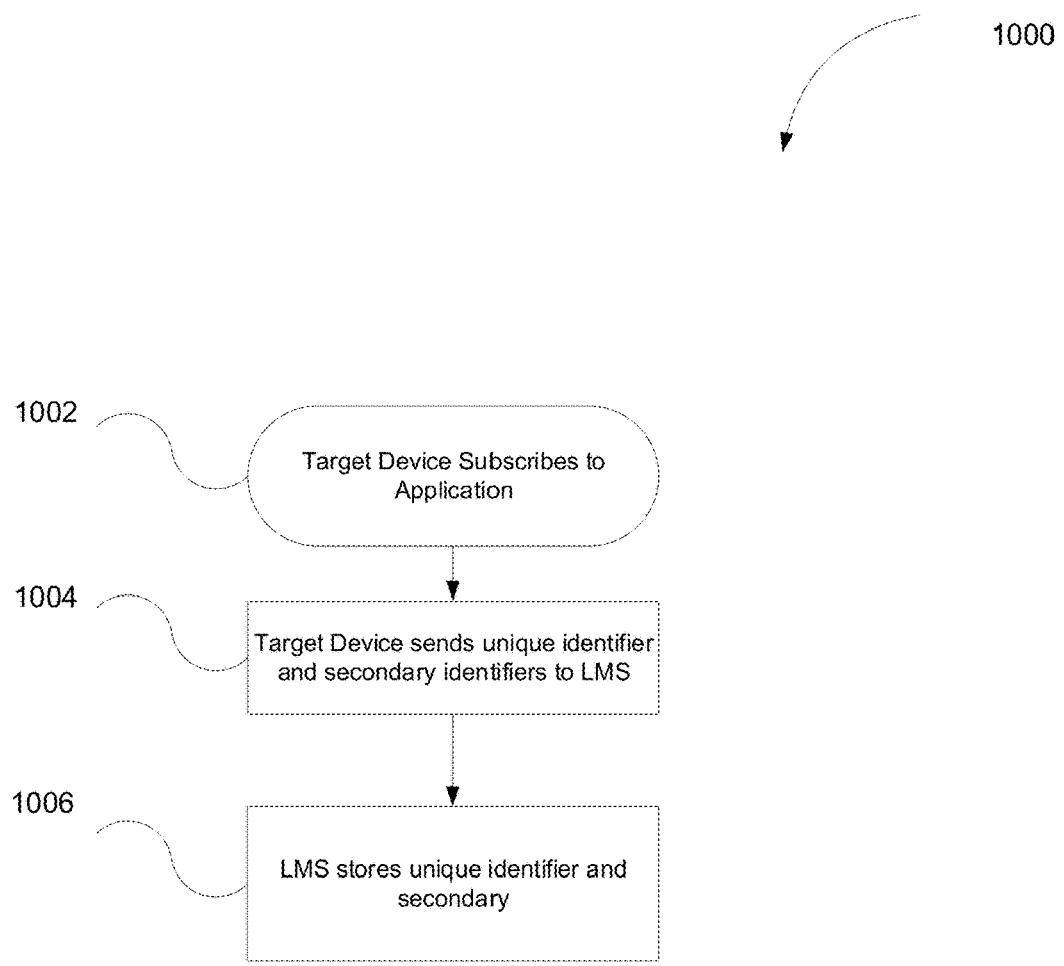
FIG. 3C, a flow chart including steps of various methods by which initialization of a system for localization and messaging a wireless communication device in accordance with some embodiments of the present invention may function.

Turning now to FIG. 3C, a flow chart (1000) including steps of various methods by which initialization of a system for localization and messaging a wireless communication device in accordance with some embodiments of the present invention may function. A target device may subscribe to an application or loyalty program for example by downloading an application for localizing and messaging a communication device (step 1002). Optionally a user may then choose different configurations including enabling no-click check in for example. The target device may send to an LMS information relating to the device such as unique identifier of first and/or subsequent networks, personal information (age, income, home location, work location, hobbies etc), configuration selections (enable no-click check in, selection of preferred retailers) and more (step 1004). Upon receipt of the information the LMS may store the information in databases (step 1006). The information may be stored in manner to enable withdrawal of secondary identifiers, personal information and more when receiving a unique identifier substantially identical to a stored unique identifier.

Figure 4:
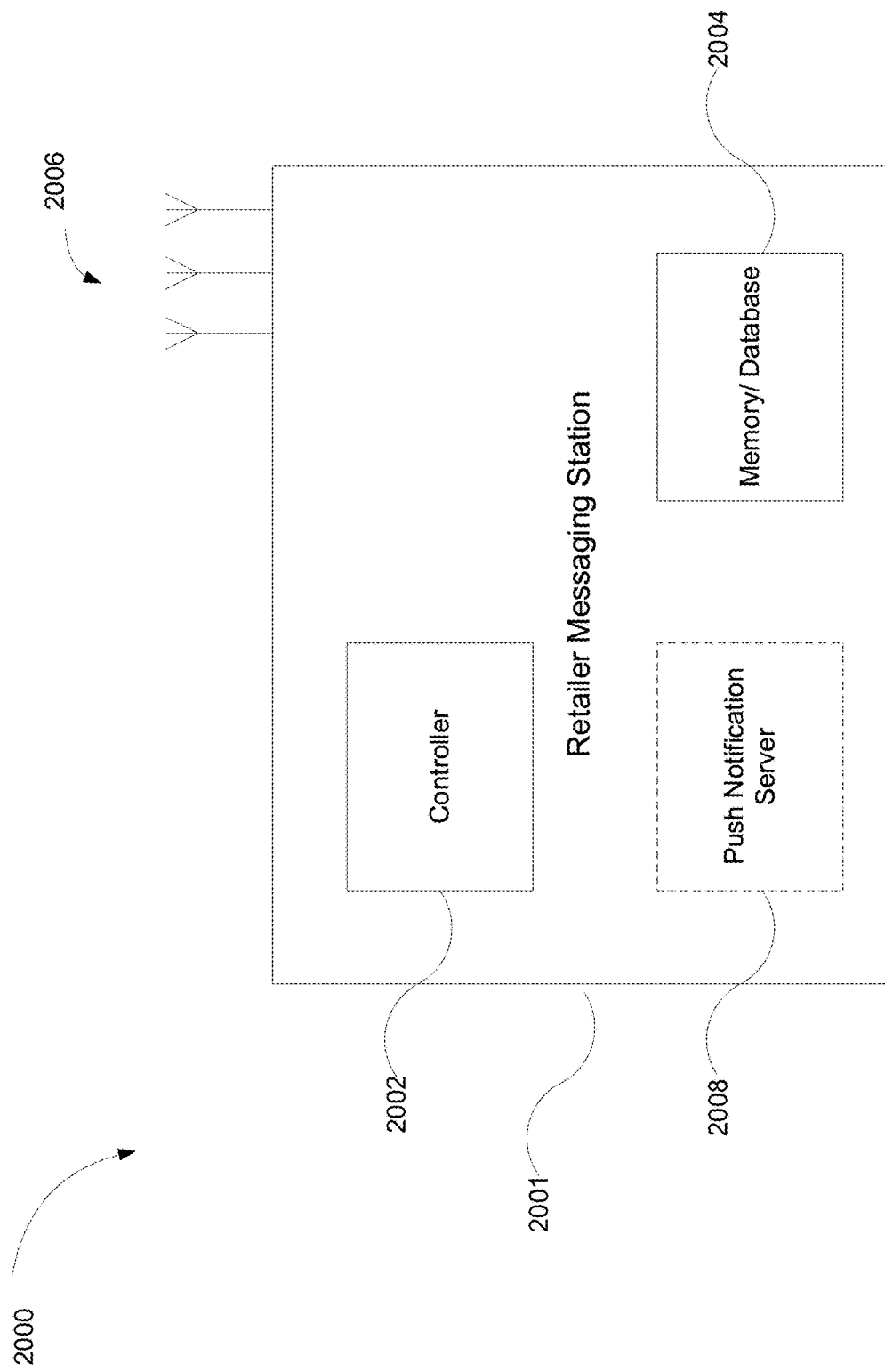
FIG. 4 is a block diagram (2000) of a specification location is shown, in accordance with some embodiments of the present invention.

Turning now to FIG. 4, a block diagram (2000) of a specification location is shown, in accordance with some embodiments of the present invention. A specification location such as retailer messaging station (RMS) 2001 may include one or more local communication nodes such as antenna(s) 2006. Antenna(s) 2006 may include different types of radios such as Wifi, Bluetooth, GPS, cellular and more. RMS 2001 may receive a trigger to its controller 2002 and cause one or more of antenna(s) 2006 to poll for a transceiver of a target device. If a target device is detected within an RCA of RMS 2001, RMS 2001 may trigger a message to be pushed to the target device.

According to some embodiments of the present invention, RMS 2001 may also include an updatable memory module such as memory/database 2004—for storing information associated with a message to be pushed to polled targeted devices: for example: content of a message, parameter dependant messages (how many times has the target device been detected at RMS 2001 etc). RMS 2001 may further include a messaging server, such as push notification server 2008 for pushing a message to the detected device. The server may be integral or associated with RMS 2001. Furthermore push notification server 2008 may utilize antenna(s) (2006) for sending the message.

What is claimed:

1. A method of detecting and responding to a presence of a person in a physical location, said method comprising:
using a first communication network to provide coarse localization of an communication device carried by the person within an area;
using a fine localization process over a second communication network to assess proximity between the device and one or more points within the area; and
automatically generating a computer system command specific to the person and a point within the area based on results from the fine localization process, wherein said computer system command triggers delivery of content to the person.

2. The method of claim 1, wherein delivering content includes issuing a location related message with content intended to motivate the person with the communication device to visit or pass by a location.

3. The method of claim 2, wherein delivered content includes content of a type selected from the group selected: (a) promotional message, (b) a greeting, and (c) a reminder related message.

4. The method of claim 1, wherein the delivered content is associated with a no-click check-in associated with a specific location.

5. The method according to claim 1, wherein said computer system command triggers allocation of resources to the person.

6. The method according to claim 5, wherein the triggered resource is a no-click check-in.

7. The method of claim 6, wherein the no-click check-in is triggered at a location closest to the communication device carried by the person.

8. The method according to claim 5, wherein the triggered resource allocation is access to a physical location.

9. A system for automatically delivering content to a person within an area including multiple locations, said system comprising:
a localization module running on a networked appliance adapted to receive over a first communication network course location information from a communication device carried by the person, and responsive to receiving said coarse location information to trigger a fine localization process to detect proximity between the communication device and one or more points within the area using a second communication network; and
presence response logic, running on either the same or on a secondary network server, adapted to generate a system command specific to the person and a point within the area based on results from the fine localization process, which system command triggers delivery to the person content associated with the one or more of the locations based on the fine localization.

10. The system of claim 9, wherein delivered content is a location related message intended to motivate the person to visit or pass by a location.

11. The system of claim 10, wherein the message includes content of a type selected from the group selected: (a) promotional message, (b) a greeting, and (c) a reminder related message.

12. The system of claim 9, wherein the content is associated with an allocation of a resource or the triggering of a no-click check-in associated with a location in the area.

* * * * *